(12) United States Patent
Shahriari

(10) Patent No.: US 7,980,172 B2
(45) Date of Patent: Jul. 19, 2011

(54) CLOSURE MECHANISM AND WASTE COMPACTION SYSTEM INCLUDING SAME

(75) Inventor: Parvis Shahriari, Town of Mount Royal (CA)

(73) Assignee: Gemma Bernabe, Town of Mount Royal, Quebec (CA)

( * ) Notice: Subject to any disclaimer, the term of this patent is extended or adjusted under 35 U.S.C. 154(b) by 381 days.

(21) Appl. No.: 12/129,164

(22) Filed: May 29, 2008

(65) Prior Publication Data

US 2009/0000496 A1 Jan. 1, 2009

Related U.S. Application Data

(60) Provisional application No. 60/940,534, filed on May 29, 2007.

(51) Int. Cl.
  *B30B 15/04* (2006.01)
  *B30B 15/30* (2006.01)
(52) U.S. Cl. ............. 100/215; 100/345; 100/229 A; 100/240; 100/283
(58) Field of Classification Search ............. 100/345, 100/215, 216, 227, 229 A, 240, 245, 247, 100/283, 285
  See application file for complete search history.

(56) References Cited

U.S. PATENT DOCUMENTS

| | | |
|---|---|---|
| 99,295 A | 2/1870 | Dederick |
| 5,022 A | 8/1872 | Dederick |
| 161,751 A | 4/1875 | Butterworth |
| 216,908 A | 6/1879 | Stopple |
| 1,405,440 A | 2/1922 | Randall et al. |
| 2,649,272 A * | 8/1953 | Barbato ............. 251/212 |
| 3,329,298 A | 7/1967 | Demas |
| 3,683,795 A | 8/1972 | Harris |
| 3,685,438 A | 8/1972 | Ziegler |
| 3,688,689 A | 9/1972 | Fierle et al. |
| 3,717,089 A | 2/1973 | Oles et al. |
| 3,835,767 A | 9/1974 | Peterson |
| 3,835,769 A | 9/1974 | Peterson |
| 3,899,967 A | 8/1975 | Powers |
| 4,748,905 A | 6/1988 | Langdon |
| 4,860,958 A | 8/1989 | Yerman |
| 4,920,782 A | 5/1990 | Hellwig |
| 5,083,509 A | 1/1992 | Hansen et al. |
| 5,355,789 A | 10/1994 | Suzuki et al. |
| 5,531,360 A | 7/1996 | Berdel et al. |
| 5,655,680 A * | 8/1997 | Asbach et al. ......... 220/495.11 |
| 5,925,321 A | 7/1999 | Koyamoto et al. |
| 6,000,323 A | 12/1999 | Schlegel |
| 6,141,945 A | 11/2000 | Becher |
| 6,375,155 B1 | 4/2002 | Janssens |
| 6,666,237 B2 | 12/2003 | De Antoni Migliorati et al. |
| 6,896,240 B2 * | 5/2005 | Wijaya ............. 251/212 |
| 6,901,974 B2 | 6/2005 | Chomik et al. |
| 6,993,891 B2 * | 2/2006 | Richardson et al. ............. 53/567 |

* cited by examiner

*Primary Examiner* — Jimmy T Nguyen
(74) *Attorney, Agent, or Firm* — Norton Rose OR LLP

(57) ABSTRACT

A waste compaction system which includes a body defining a waste-receiving receptacle having a perimeter defining an open top end. A bottom wall of the receptacle is vertically movable by a driving system to produce an upwardly directed compaction force within the receptacle. An iris-type closure mechanism extends over the open top end and is displaceable between a first, open position where the closure mechanism surrounds the open top end and a second, closed position where the opening is at least partially closed by the closure mechanism. In the second position of the closure mechanism, the driving system displaces the bottom wall upwards thereby compacting the waste contained within the receptacle against the closure mechanism.

17 Claims, 6 Drawing Sheets

CLOSURE MECHANISM AND WASTE COMPACTION SYSTEM INCLUDING SAME

CROSS-REFERENCE TO RELATED APPLICATIONS

The present application claims priority on U.S. provisional patent application No. 60/940,534 filed May 29, 2007, the entire contents of which is incorporated herein by reference.

TECHNICAL FIELD

The present invention relates generally to waste compaction systems and to closure mechanisms.

BACKGROUND ART

A variety of waste disposal devices exist which compact the waste in order to reduce the volume thereof. Among such known waste compaction systems are those which compact the waste by have a displaceable wall portion that is raised or lowered in order to reduce the size of the waste container and thereby compress the waste contained therein. For example, devices are known which employ a vertically displaceable bottom wall, a top cover fully closing an open top end of the container, and a driving system displacing the bottom wall upwardly to compress waste against the closed top cover. However, several disadvantages exist with such systems. For example, they do not allow waste to be received therein during the compression cycle, i.e. with the top cover in the closed position, and/or have a relatively complex configuration, and/or can inadvertently trap a hand or other body portion of a user with the top cover during the compression cycle, thus risking serious injury to the user. Accordingly, improvements are desirable.

SUMMARY

It is therefore an aim of the present invention to provide an improved closure mechanism and waste compaction system having same.

Therefore, in accordance with one aspect of the present invention, there is provided a waste compaction system comprising: a body defining a waste-receiving receptacle having a perimeter defining an open top end, at least a bottom wall of the receptacle being vertically movable; a driving system operatively connected to the bottom wall for vertically moving the bottom wall to produce, when being displaced upwards, a corresponding upwardly directed compaction force on waste within the receptacle; an iris-type closure mechanism extending over the open top end and being displaceable between an open position, where the closure mechanism surround an opening aligned with the open top end without obstructing access to the open top end, and a closed position, where the opening is at least partially closed; and wherein with the closure mechanism in the second position, the driving system displaces the bottom wall upward such as to compact the waste contained within the receptacle against the closure mechanism.

There is also provided, in accordance with another aspect of the present invention, a waste compaction system comprising: a waste-receiving receptacle having an open end defined at a top thereof and a vertically movable bottom wall; a closure mechanism comprising a first ring surrounding the open end, a second ring concentric with the first ring and vertically offset therefrom, and a plurality of articulated strips having opposed ends pivotally connected to a respective one of the first and second rings at circumferentially regularly spaced apart points thereon, the first and second rings being rotatable relative to one another between a first position where the strips define and surround an opening aligned with the open end and a second position where the strips at least partially close the opening; and a driving system operatively connected to the bottom wall for vertically moving the bottom wall upwards thereby compacting the waste contained within the receptacle against the closure mechanism when the first and second rings are in the second position.

There is further provided, in accordance with another aspect of the present invention, a waste compaction system comprising: a waste-receiving receptacle having an open top end, a vertically movable bottom wall and at least one side wall surrounding the open top end and the bottom wall; a closure mechanism extending over the open top end and being displaceable between a first position, where the closure mechanism extends from the at least one side wall to define and surround an opening aligned with the open top end, and a second position, where a diameter of the opening is reduced without the opening being completely closed; and a driving system operatively connected to the bottom wall for vertically moving the bottom wall to compact the waste contained within the receptacle against the closure mechanism when the closure mechanism is in the second position.

In accordance with another aspect of the present invention, there is further provided a closure mechanism for removably covering an opening, the closure mechanism comprising first and second concentric rings vertically offset from one another, and a plurality of articulated strips having opposed ends pivotally connected to a respective one of the first and second rings at regularly spaced apart points about a circumference thereof, the first and second rings being rotatable relative to one another between a first position, wherein the strips define and surround the opening, and a second position, wherein the strips at least partially close the opening, the strips in the second position crossing each other in an hourglass-shaped configuration between the first and second rings.

BRIEF DESCRIPTION OF THE DRAWINGS

Reference will now be made to the accompanying drawings, showing by way of illustration a particular embodiment of the present invention and in which.

DETAILED DESCRIPTION OF PARTICULAR EMBODIMENTS

A waste compaction system 10 according to a particular embodiment of the present invention is preferably configured for use in commercial or industrial applications, although domestic use if of course also possible, wherein a large volume of waste is required to be compacted in order to reduce the frequency of emptying the garbage container and therefore also reduce the number of plastic garbage bags required. This savings in time (i.e. of the people otherwise required to regularly empty the garbage containers) and cost (of the plastic garbage bags) can be considerable for commercial establishments where a very large volume of garbage is generated, such as fast food restaurants for example. As will be scan below, the present garbage compaction system 10 is adapted to fit within a typical trash can or container, such as the ones often used in fast food restaurants for example. Accordingly, the present system remains relatively unobtrusive, being encased by the outer plastic casing of the trash can. This can be done, as described below, either by retrofitting the existing trash cans or by providing a new trash can designed expressly to enclose the present system. It is understood, therefore, that the present waste compaction system 10 can include the external case which makes up the trash container.

Although the term waste is used throughout to describe the material placed within the present waste compaction system 10 for compression/compaction, it is understood that the term waste as used herein includes trash, garbage, refuse, plastic, paper, as well as any other products which are to be compressed or compacted in order to reduce the overall volume they occupy. For example, although in one embodiment the present system 10 is used for compaction of garbage, in another alternate embodiment it is used compacting recyclable materials, such as plastic, in order to compact such relatively bulky recyclable materials, thereby making the transport and storage of the material to be recycled more efficient and less costly. Similarly, when the present system 10 is used for compacting garbage, this greatly reduces the burden on commercial establishments which generate a large volume of garbage, such as fast-food restaurants for example.

Figure 1:
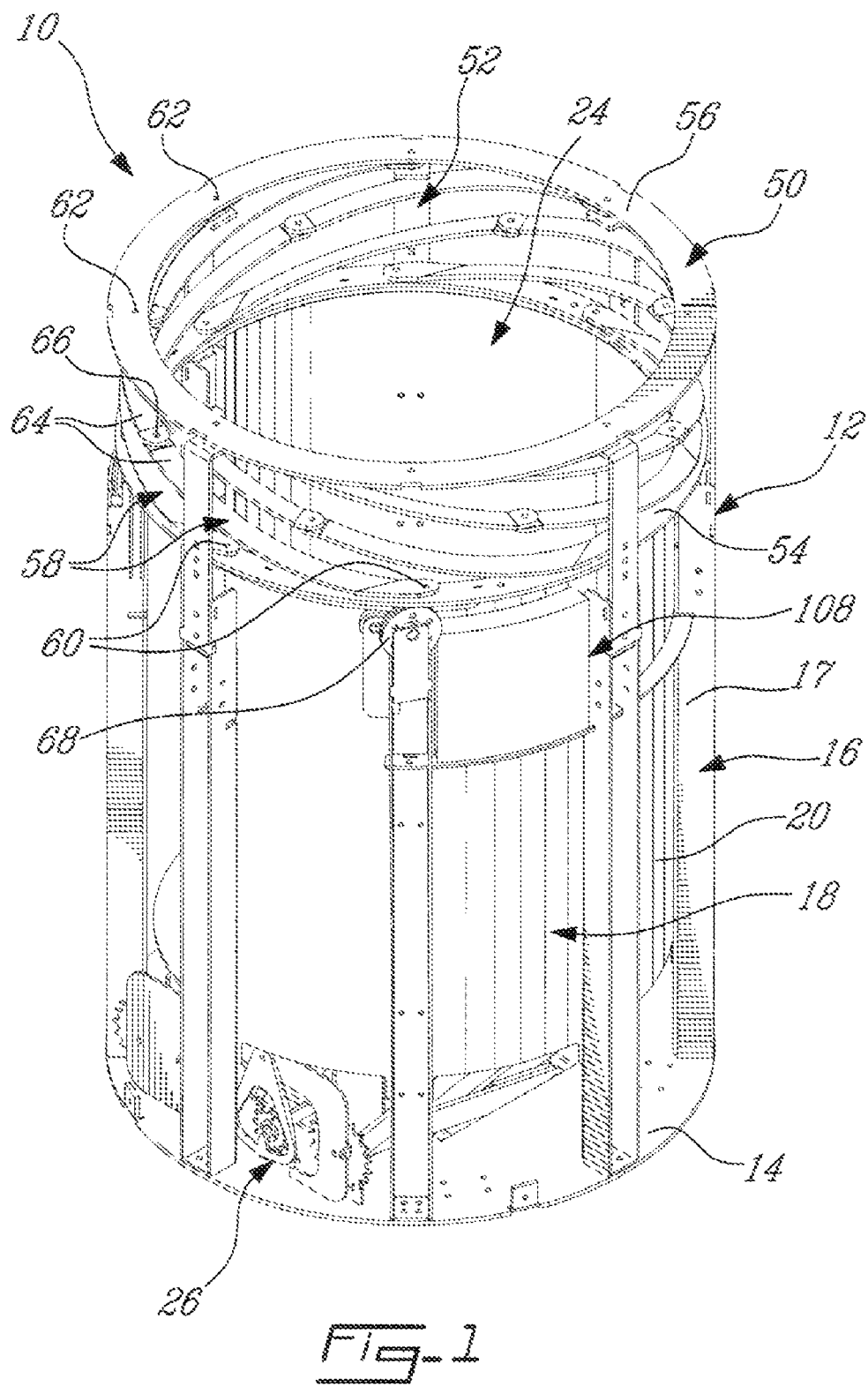
FIG. 1 is a perspective view of a waste compaction system according to a particular embodiment of the present invention, with a closure mechanism thereof shown in an open position.

Referring to FIG. 1, the waste compaction system 10 generally comprises a body 12, which includes a base 14, a support structure 16 including a plurality of members 17 extending from the base 14, and a waste-receiving receptacle 18 defined within and surrounded by the support structure 16.

Figure 2:
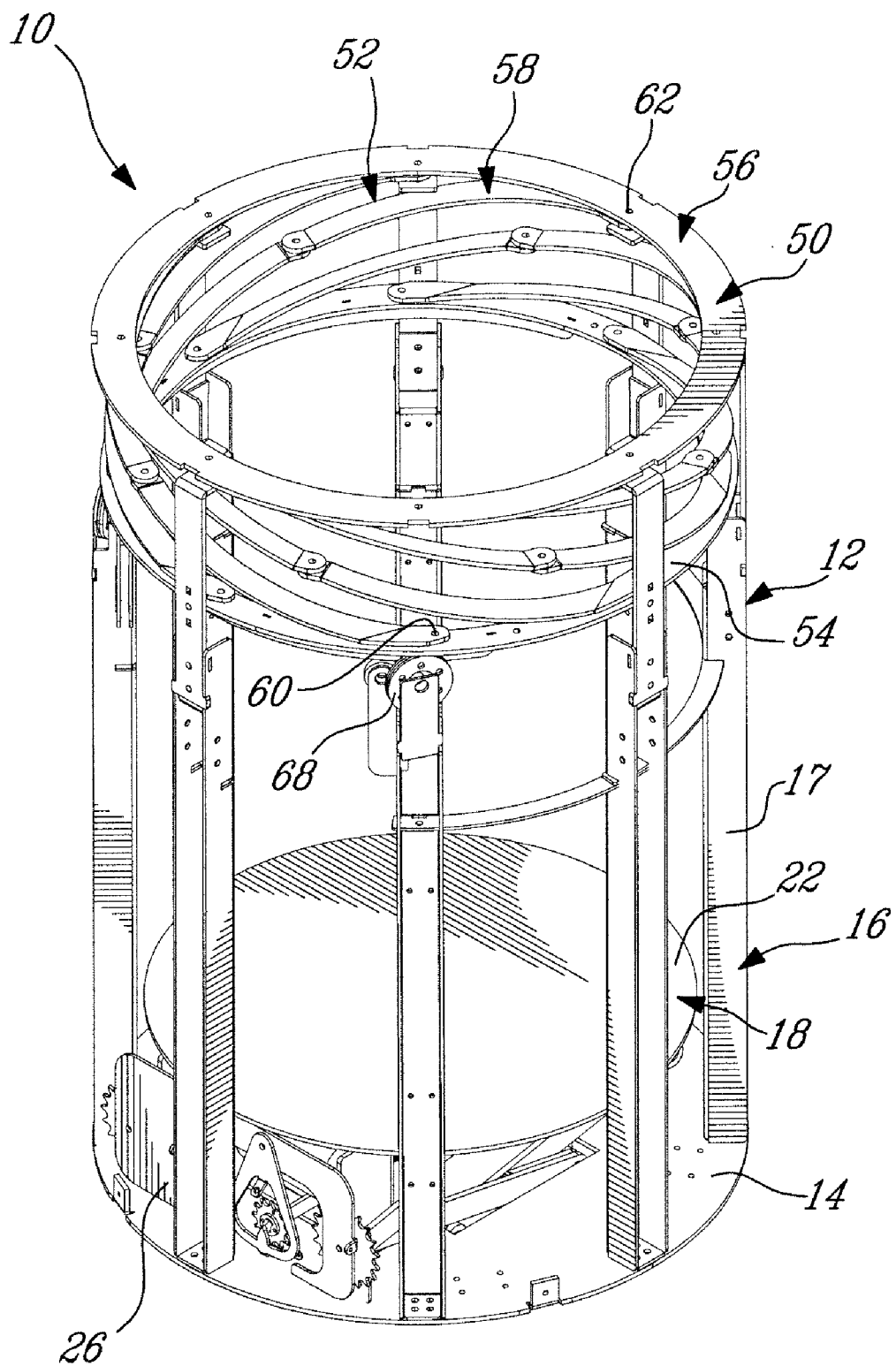
FIG. 2 is a perspective view of the waste compaction system of FIG. 1, with a side wall of a waste-receiving receptacle thereof omitted and a base wall shown partially transparent for improved clarity.

The receptacle 18 comprises a cylindrical side wall 20 and a circular bottom wall 22 (see FIG. 2). The side wall 20 forms a perimeter surrounding the bottom wall 22 and an open top end 24 of the receptacle 18. The side wall 20 and bottom wall 22 are adjacent without being connected to one another, such that the bottom wall 22 is free to move vertically within the perimeter defined by the side wall 20.

As noted above, when in use the waste compaction system 10 is preferably received within a trash container of any adequate configuration, with or without a cover allowing access to the open end 24 of the receptacle 18. As such, the system 10 can be shaped and configured to fit within existing trash containers in order to be used to "retro-fit" such trash containers, or alternately can be integrated into a new trash container which incorporates the system 10 therein. For example, the outer casing of the trash container preferably has a shape corresponding to the outer perimeter of the support structure 16 of the waste compaction system 10, such that it fits relatively snugly thereover. The outer case is however, in at least one preferred embodiment, removable from the base system 10, such as to allow access for repair, etc. For example, the outer casing which forms the trash container may be a cylindrical tube, for example, which slide down overtop of the system 10. Of course, any shape or configuration for the outer casing of the trash container is possible.

In a particular embodiment, the inner surface of the side wall 20 of the receptacle 18 and/or the bottom wall 22 is covered with a resistant and flexible lining (not shown), such as for example one made of rubber, to facilitate cleaning of the receptacle 18. The lining may also be removable, such as to permit replacement or further facilitate cleaning.

Figure 3:
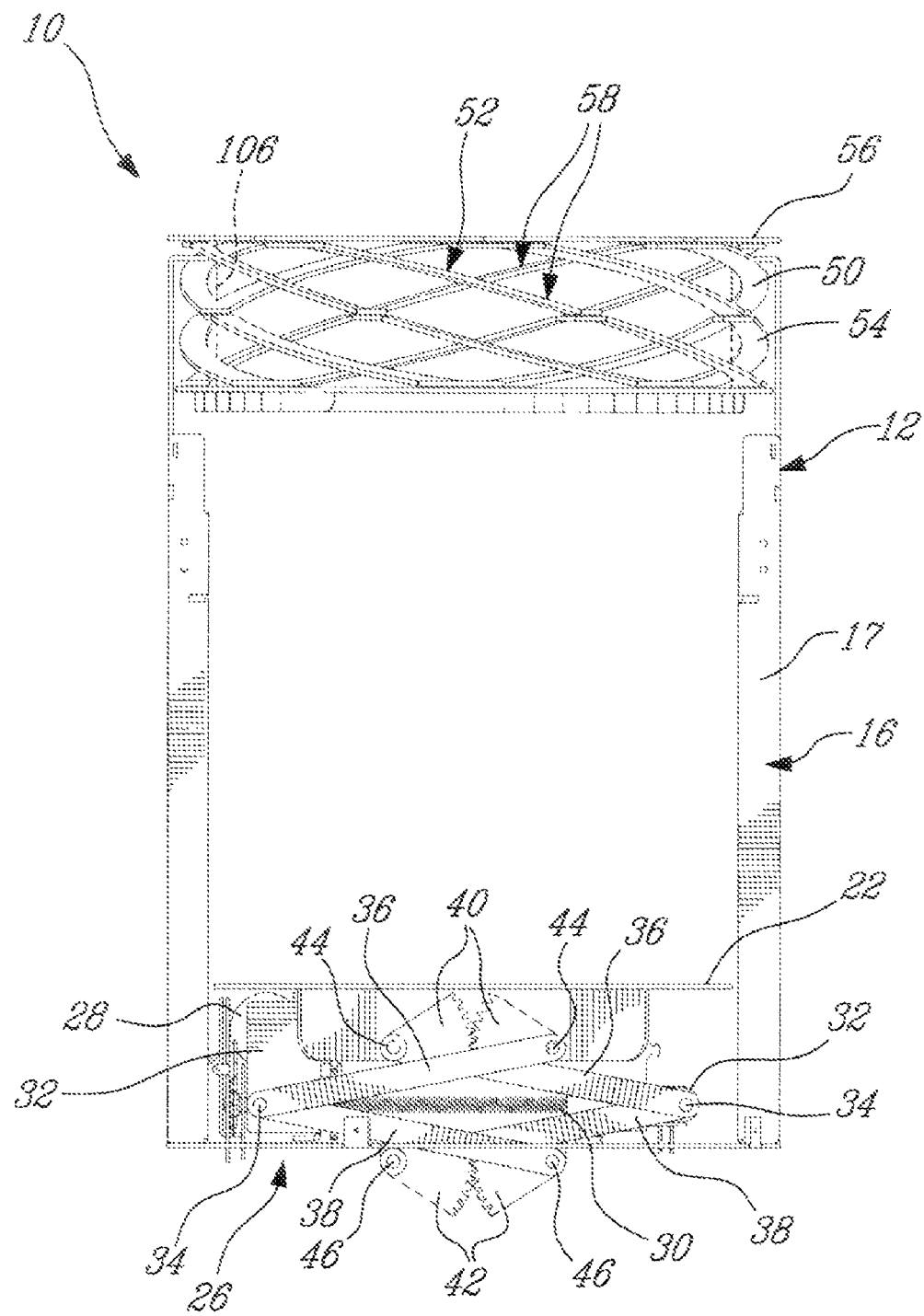
FIG. 3 is a side view of the waste compaction system of FIG. 2.
Figure 4:
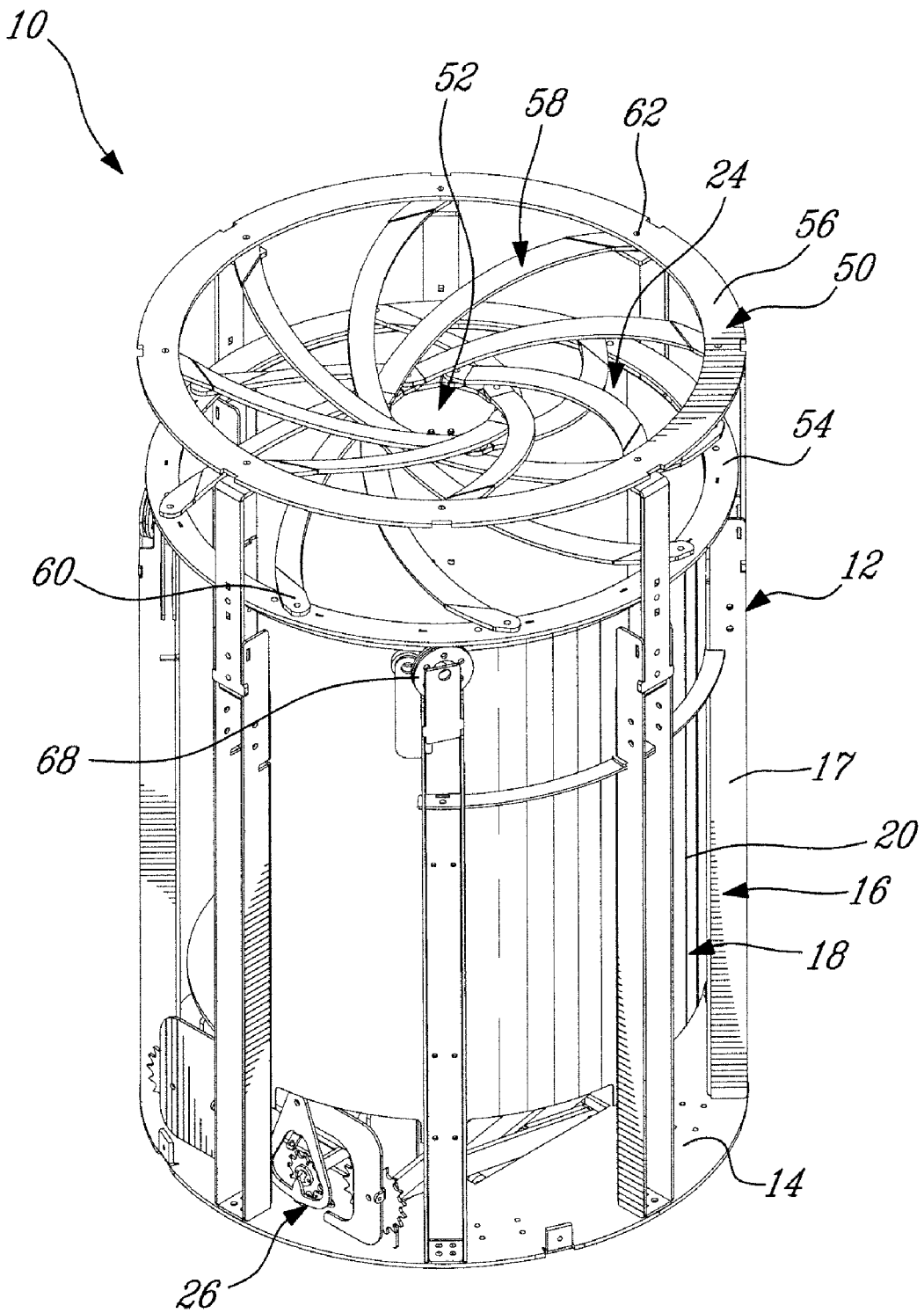
FIG. 4 is a perspective view of the waste compaction system of FIG. 1, with the closure mechanism shown in a closed position.

As can be best seen in FIGS. 2-3, the waste compaction system 10 comprises a driving mechanism or system 26 which is operatively connected to the bottom wall 22 to vertically displace it between a low position (FIG. 2) and a fully compacted upper position (FIG. 4). It is understood that any one of a variety of adequate driving systems can be used, provided the driving system produces a vertical movement of the bottom wall 22 and an upwardly directed compression force adapted to the type of waste being contained and compressed in the receptacle 18. A particular embodiment of the driving system 26 is shown and will be described below as an example of a suitable driving system 26 for the waste compaction system 10.

In the embodiment shown, the driving system 26 comprises a motor 28 driving a threaded shaft 30 extending under the bottom wall 22. Two movable arm supports 32 are threadably received on the threaded shaft 30 while being prevented from rotating, such that rotation of the threaded shaft 30 produces a translation of the movable arm supports 32 in opposite directions. Each arm support 32 includes a pivot 34 pivotally receiving an end of each one of a pair of parallel upper arms 36 and a pair of parallel lower arms 38 extending toward the other arm support 32. The other end of each arm 36, 38 includes a pivotable gear portion 40, 42 attached thereto by a respective pivot 44, 46. The pivots 44 of the gear portions 40 of the upper arms 36 are connected to the bottom wall 22, whether directly or indirectly, while the pivots 46 of the gear portions 42 of the lower arms 38 are attached to the base 14 of the waste compaction system 10, whether directly or indirectly. The gear portions 40 of the aligned upper arms 36 extending from each movable arm support 32 are meshed with one another, and the gear portions 42 of the aligned lower arms 38 extending from each movable arm support 32 are meshed with one another. As such the arms 36, 38 on each side form a diamond-shaped extendable support for the bottom wall 22.

As the threaded shaft 30 is rotated in a first direction by the motor 28, the movable arm supports 32 are brought closer to one another, which increases the vertical distance between the meshed gear portions 40 of the upper arms 36 and the meshed gear portions 42 of the lower arms 38, and as such between the base 14 and the bottom wall 22. The bottom wall 22 thus moves upwardly and produces an upwardly directed compression force against the content of the receptacle 18. In a particular embodiment, the bottom wall 22 at its highest point is located approximately at one half of the total height of the side wall 20. When the threaded shaft 30 is rotated in the opposite direction by the motor 28, the movable arm supports 32 are spaced apart from one another, thus decreasing the vertical distance between the meshed gear portions 40 of the upper arms 36 and the meshed gear portions 42 of the lower arms 38 and moving the bottom wall 22 downwardly.

In a particular embodiment, a pressure sensor (not shown) is provided in connection with the bottom wall 22 such as to sense a pressure produced thereby, and the motor 28 is actuated to move the bottom wall 22 upwardly until the pressure sensed by the pressure sensor reaches a desired pressure threshold, to then optionally maintain the pressure for a given period of time, and to move the bottom wall 22 back to its bottommost position thereafter.

Referring to FIGS. 1-3, the waste compaction system 10 further comprises an iris-type closure mechanism 50 aligned with the open end 24 of the receptacle 18, the closure mechanism 50 being shown in an open position thereof. The closure mechanism 50 in the open position defines an opening 52 which is aligned with the open end 24 of the receptacle 18 and, in the particular embodiment shown, the opening 52 has the same diameter as the open end 24 of the receptacle 18.

The closure mechanism 50 includes a lower ring 54 which is retained along an outer surface of the side wall 20 of the receptacle 18 at the top thereof, and an upper ring 56 supported by the members 17 of the support structure 16 above the lower ring 54 and in alignment therewith. In the embodiment shown, the rings 54, 56 are concentric and have a same diameter.

A plurality of articulated strips 58 extend between the rings 54, 56, with the end of each strip 58 being pivotally connected to a respective one of the rings 54, 56 by a corresponding pivot 60, 62 in a regularly spaced apart manner. In the embodiment shown, each strip 58 is elongated and curved, has a flat, rectangular cross-section and is made of two portions 64 (see FIG. 1) of approximately equal length which are pivotally connected to one another by a pivot 66 located at a middle point of the strip 58. In alternate embodiments which are not shown, the strips are made of three or more pivotally connected portions or of a single portion if the material of the strip is flexible enough to allow the rotational motion which will be described further below, and/or the strips are provided with reinforcing features such as a longitudinal rib extending along a length thereof.

Each strip 58 is, in at least the depicted embodiment, curved and attached to the lower ring 54 at a position angularly offset from its attachment position on the upper ring 56, with the same angular offset being applied to each strip 58, such that in the open position, the strips 58 extend between the lower and upper rings 54, 56 in alignment therewith. In other words, the strips 58 extend and are contained within an annular space defined between the aligned outer diameters and the aligned inner diameters of the rings 54, 56.

In a particular embodiment, the strips 58 and rings 54, 56 are made of steel, for example stainless steel or hot rolled steel. Alternately, the strips 58 can be made of a heavy duty plastic or composite, and can be formed by any suitable method such as molding.

The waste compaction system 10 preferably further comprises a rotation system 108 (shown schematically in FIG. 1) for rotating the rings 54, 56 relative to one another. The rotation system 108 may be an automated rotation system including for example a DC motor connected to a gear box. Alternately, the rotation system 108 can be a manually actuated system such that the rings 54, 56 can be rotated relative to each other by hand, the rotation system including for example a wheel, crank, knob, etc. which is rotated manually by the user.

In the embodiment shown, the lower ring 54 is rigidly connected to the side wall 20 of the receptacle 18, the upper ring 56 is rigidly connected to the support structure 16 such as to have a fixed position, and the rotation system rotates the lower ring 54 through rotation of the side wall 20. A plurality of wheels or bearings 68 support the lower ring 54 during its rotation by engaging a bottom surface thereof. Alternate embodiments include, for example, a lower ring that is rotated independently of the side wall, where the upper ring is rotated while the lower ring remains fixed, and where both rings are rotated in opposite directions.

Figure 5:
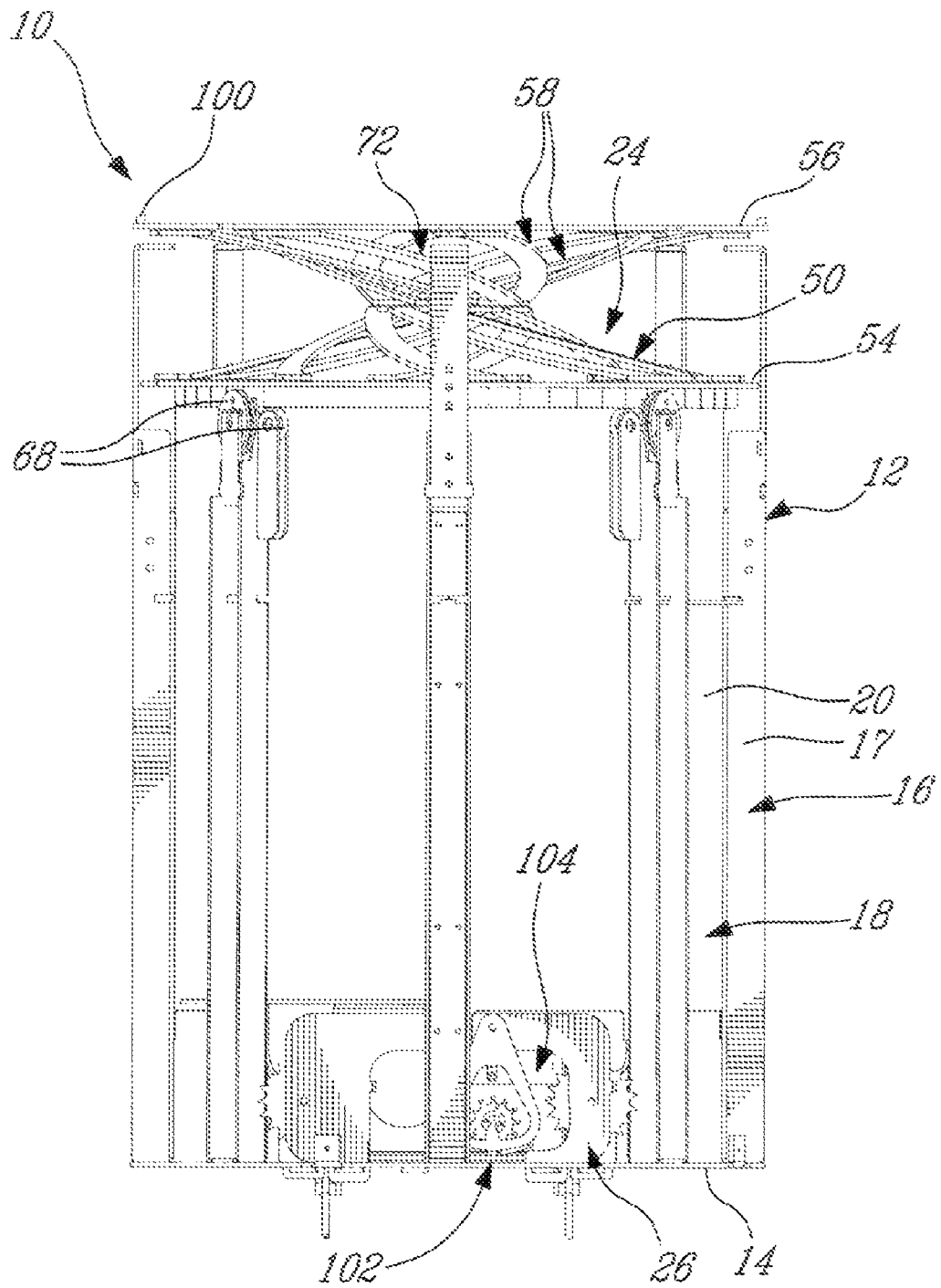
FIG. 5 is a side view of the waste compaction system of FIG. 4.
Figure 6:
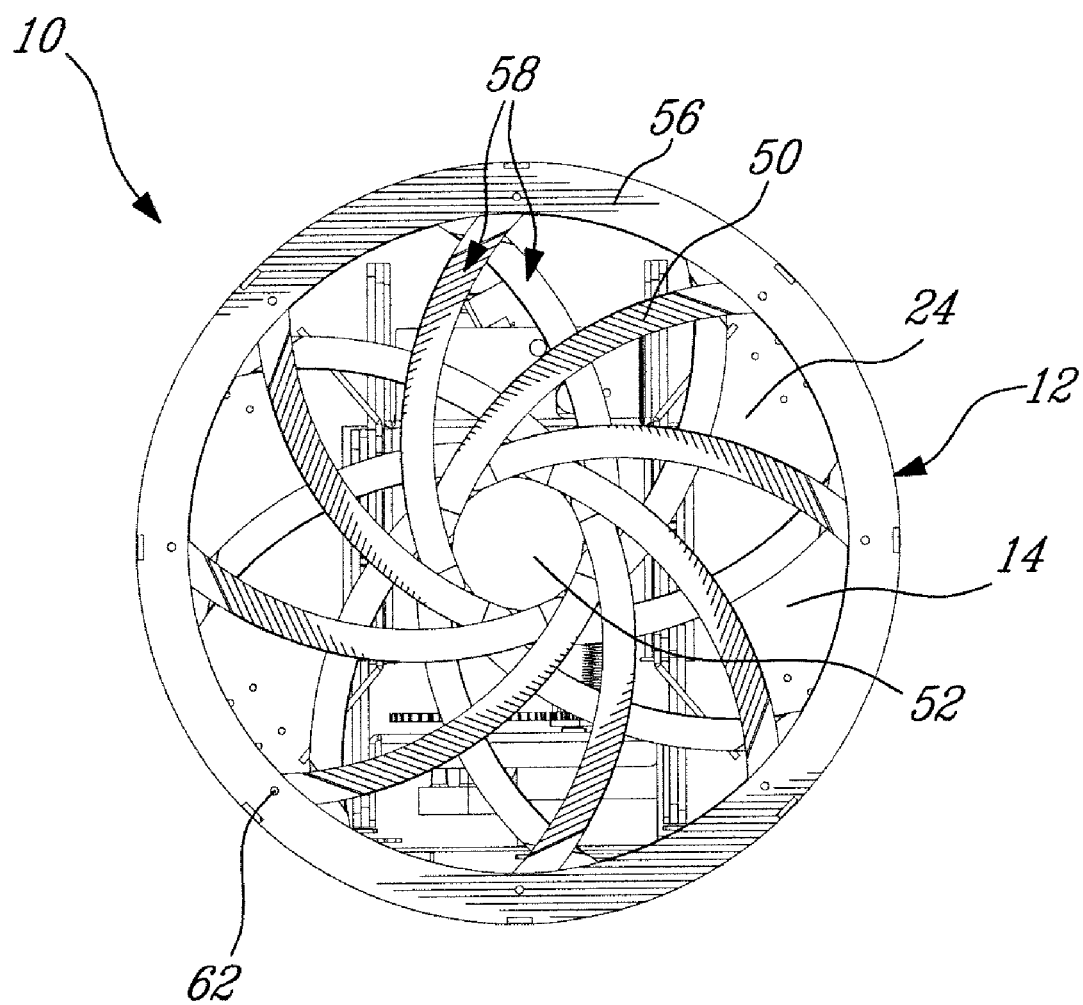
FIG. 6 is a top view of the waste compaction system of FIG. 4, with the waste-receiving receptacle omitted for clarity.

In the embodiment shown, and as depicted in FIGS. 4-6, the lower ring 54 is rotated approximately ¼ of a turn (i.e. 90 degrees) with respect to the upper ring 56 to displace the closure mechanism 50 into a closed position. It can be seen that in the closed position, the strips 58 cross one another and still surround the opening 52 (see FIGS. 4 and 6), the diameter of which is considerably reduced from the open position. In a particular embodiment, the opening 52 in the closed position is sized such that it has a minimum diameter which is still sufficiently large to allow a human hand to pass therethrough, such as at least approximately 5 inches in diameter. This provides a safety feature, in that if someone inadvertently has a hand or wrist inserted through the opening 52 in the open position when the rings 54, 56 of the closure mechanism start rotating toward their closed position, the hand/wrist of the person will remain within the shrinking opening 52 throughout the transition between the open and closed position, and will be removable from the opening 52 even in the fully closed position. As such, the risk of injury by having someone's hand or other body portion pinched by the closure mechanism 50 is advantageously reduced and ideally eliminated. In an alternate embodiment which is not shown and where the above-mentioned safety feature is not desired, the strips 58 in the closed position completely close the opening 52.

As can be seen more clearly in FIG. 5, the strips 58 in the closed position define an hourglass shape from a side profile, formed by two domes extending in opposite vertical directions from the opening 52. The upper dome defines a somewhat conically shaped temporary receptacle 72 extending downwardly from the upper ring 56 down to the opening 52, which is approximately at the vertical midpoint between the lower and upper rings 54, 56 when the closure mechanism is in the fully closed position. As such, with the closure mechanism 50 in the closed position, waste can temporarily be received within this temporary receptacle 72 and remain there if too large to fall through the reduced opening 52. When the closure mechanism 50 is moved back into the open position, the accumulated waste located in the temporary receptacle, if any, falls through the widening opening 52 and into the receptacle 18.

The opposed domes configuration of the embodiment shown advantageously increases the resistance of the closure mechanism 50 to the compression force transferred by the waste from the upwardly moving bottom wall 22, for example when compared to a two-dimensional iris-type closure mechanism. The shape and structure of the upper dome is particularly adapted for providing resistance to a pressure force being applied thereunder.

As seen in FIG. 5, the upper ring 56 preferably includes fasteners 100 for retaining a top portion of a garbage bag therearound, allowing the bag to extend within the receptacle 18 through the open end 24 and the opening 52.

The waste compaction system 10 may also he fitted with a safety mechanism 102, such as a limit switch and/or adequate control mechanisms, which ensure that the driving system 26 moves the bottom wall 22 upwardly only when the closure mechanism 50 is in the closed position. In a particular embodiment, the waste compaction system 10 further comprises a disabling mechanism 104 which is operated by a user to disable the safety mechanism mentioned above, in order to allow the actuation of the driving system 26 to move the bottom wall 22 up while the closure mechanism 50 is in the open position, for example in order to provide assistance in the removal of a bag from the receptacle 18.

A liner 106 (see FIG. 3) is preferably provided between the lower and upper rings 54, 56 covering the strips 58 and any free space defined therebetween. The liner is preferably made of an adequate type of waterproof material, such as for example synthetic leather, rubber, synthetic rubber, etc.

In use, a trash bag is preferably attached to the upper ring 56 and extends down within the receptacle 18, thereby covering the closure mechanism 50 and the receptacle 18 so that the waste does not come in direct contact with any part of the waste compaction system 10. With the closure mechanism 50 in its open position and the bottom wall 22 in its bottommost position, waste is deposited in the bag through the open end 24 of the receptacle 18, as one would when using any open-topped trash container.

The compression cycle starts, for example, after a given period of time as determined by a control system (ex: every hour) and/or after a given volume or mass of waste has been received within the receptacle 18 as determined by a control system and/or upon actuation of a switch or any adequate command receiving structure by a user. Any other adequate parameter can alternately be used in the determination of the start of the compression cycle. Upon the start of the compression cycle, the rotation system moves the closure mechanism 50 into the closed position, and the driving system 26 then moves the bottom wall 22 upwardly thereby compressing the waste against the strips 58 (covered by the lining) of the closure mechanism 50, for example until a predetermined maximum compaction pressure is read by a pressure sensor. As mentioned above, the hourglass shape of the strips 58 in the closed position helps the strips 58 resist the compression force produced by the bottom wall 22.

As described above, during compression users can still deposit waste on top of the closure mechanism 50, the waste being temporarily received within the temporary receptacle 72 defined by the strips 58 between the opening 52 and the upper ring 56. Once the waste within the receptacle has been sufficiently compressed, the driving system 26 displaces the bottom wall 22 back to its bottommost position and the rotation system moves the closure mechanism 50 back to its open position, either after the downward motion of the bottom wall 22 or simultaneously therewith. The waste received in the temporary receptacle 72, if any, falls into the receptacle 18 through the opening 52 which widens as the closure mechanism opens, and users can continue depositing waste directly within the receptacle 18 thereafter.

In a particular embodiment, the waste compaction system 10 also comprises an alarm which alerts users when the receptacle 18 is too full for further compression, for example after several compaction cycles for example, such that the full bag can be removed and replaced with an empty bag.

As mentioned above, in a particular embodiment a user can actuate a switch or any adequate command receiving structure to allow actuation of the driving system 26 to move the bottom wall 22 upwardly with the closure mechanism 50 remaining in the open position. This feature is helpful when, for example, the user desires to be assisted in the removal of a full and relatively heavy bag from the receptacle 18, or to facilitate cleaning of the receptacle 18, etc.

The closure mechanism 50 such as shown and described herein need not only be limited to its use in a waste compactor, and can also be used in a variety of other applications, such as for example as a roof structure over any adequate type of building where selective opening and closing of the roof is desired. In this embodiment, the closure mechanism 50 preferably completely closes the opening in the closed position, and in a particular embodiment includes a collection system for collecting and evacuating water potentially retained within the temporary receptacle 72 while the closure mechanism is in the closed position. Alternately, the closure mechanism 50 can define an opening in the closed position, and the collection system preferably includes an adequate structure aligned with the opening 52, whether permanently located at the center of the closure mechanism 50 or defined by one or several of the strips 58, for collecting and redirecting the water. The closure mechanism 50 can alternately similarly be used in a number of other adequate applications where an opening needs to be selectively opened and closed, including applications where for safety purposes it is preferred to leave the opening partially open in the closed position.

The embodiments of the invention described above are intended to be exemplary. Those skilled in the art will therefore appreciate that the foregoing description is illustrative only, and that various alternate configurations and modifications can be devised without departing from the invention. For example, although the receptacle 18 has been depicted and described as cylindrical, alternate shapes are also possible, including a rectangular shape. Similarly, the rings 54, 56 which are shown as circular can be of any other adequate shape. The closure mechanism 50 of the waste compaction system can include other adequate configurations of the iris-type mechanism, or can be replaced by other adequate types of closure mechanisms allowing the reduction of an opening thereof. Accordingly, the present invention is intended to embrace all such alternate configurations, modifications and variances.

The invention claimed is:

1. A waste compaction system comprising:
   a body defining a waste-receiving receptacle having a perimeter defining an open top end, at least a bottom wall of the receptacle being vertically movable;
   a driving system operatively connected to the bottom wall for vertically moving the bottom wall to produce, when being displaced upwards, a corresponding upwardly directed compaction force on waste within the receptacle;
   an iris-type closure mechanism extending over the open top end and the iris-type closure mechanism is configured for displacement between an open position, where the closure mechanism surround an opening aligned with the open top end without obstructing access to the open top end, and a closed position, where a diameter of the opening is substantially reduced without the opening being completely closed; and
   wherein with the closure mechanism in the closed position, the driving system displaces the bottom wall upward to compact the waste contained within the receptacle against the closure mechanism.

2. The waste compaction system as defined in claim 1, wherein the diameter of the opening in the closed position is at least about five inches.

3. The waste compaction system as defined in claim 1, wherein in the closed position the closure mechanism defines a temporary receptacle upwardly of the opening.

4. The waste compaction system as defined in claim 1, further comprising a safety mechanism allowing actuation of the driving system for elevating the bottom wall only when the closure mechanism is in the closed position.

5. The waste compaction system as defined in claim 4, further comprising a disabling mechanism for disabling the safety mechanism, to allow the actuation of the driving system to elevate the bottom wall with the closure mechanism in the open position.

6. The waste compaction system as defined in claim 1, wherein the closure mechanism comprises a first ring, a second ring concentric with the first ring and downwardly offset therefrom, and a plurality of articulated strips having opposed ends pivotally connected to a respective one of the first and second rings in a regularly spaced apart manner, the first and second rings being rotatable relative to one another between the open and closed positions of the closure mechanism, the strips in the open position defining and surrounding the opening and in the closed position at least partially closing the opening.

7. A waste compaction system comprising:
a waste-receiving receptacle having an open end defined at a top thereof and a vertically movable bottom wall;
a closure mechanism comprising a first ring surrounding the open end, a second ring concentric with the first ring and vertically offset therefrom, and a plurality of articulated strips having opposed ends pivotally connected to a respective one of the first and second rings at circumferentially regularly spaced apart points thereon, the first and second rings being rotatable relative to one another between a first position where the strips define and surround an opening aligned with the open end and a second position where the strips partially close the opening; and
a driving system operatively connected to the bottom wall for vertically moving the bottom wall upwards thereby compacting the waste contained within the receptacle against the closure mechanism when the first and second rings are in the second position.

8. The waste compaction system as defined in claim 7, wherein in the second position, a diameter of the opening is substantially reduced relative to the opening in the first position, without the opening being completely closed in said second position.

9. The waste compaction system as defined in claim 7, further comprising a safety mechanism allowing actuation of the driving system to compress the waste only when the first and second rings are in the second position.

10. The waste compaction system as defined in claim 9, further comprising a disabling mechanism for disabling the safety mechanism to allow the actuation of the driving system to elevate the bottom wall when the first and second rings are in the first position.

11. The waste compaction system as defined in claim 7, further comprising rotation system for relatively rotating the first and second rings between the first and second positions.

12. The waste compaction system as defined in claim 7, wherein the closure mechanism comprises a lining extending between the rings and covering the strips.

13. The waste compaction system as defined in claim 7, wherein an upper one of the rings includes fasteners for retaining a top portion of a bag thereto in a position allowing the bag to extend through the opening and the open end and within the receptacle.

14. The waste compaction system as defined in claim 7, wherein in the second position the strips define a conically shaped receptacle extending downwardly from an upper one of the rings.

15. The waste compaction system as defined in claim 7, wherein one of the rings has a fixed position and the other ring is rotated by a rotation system.

16. The waste compaction system as defined in claim 15, wherein the other ring is rigidly connected to at least one side wall of the waste-receiving receptacle, the at least one side wall surrounding the bottom wall and the open end and being free from the bottom wall, and the rotation system rotates the other ring through a rotation of the at least one side wall.

17. A waste compaction system comprising:
a waste-receiving receptacle having an open top end, a vertically movable bottom wall and at least one side wall surrounding the open top end and the bottom wall;
a closure mechanism extending over the open top end and the closure mechanism is configured for displacement between a first position, where the closure mechanism extends from the at least one side wall to define and surround an opening aligned with the open top end, and a second position, where a diameter of the opening is reduced without the opening being completely closed; and
a driving system operatively connected to the bottom wall for vertically moving the bottom wall to compact the waste contained within the receptacle against the closure mechanism when the closure mechanism is in the second position.

* * * * *